UNITED STATES PATENT OFFICE 2,660,735

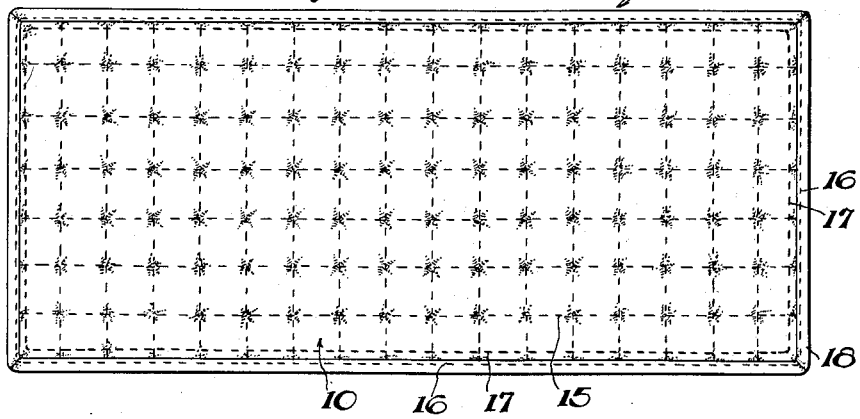
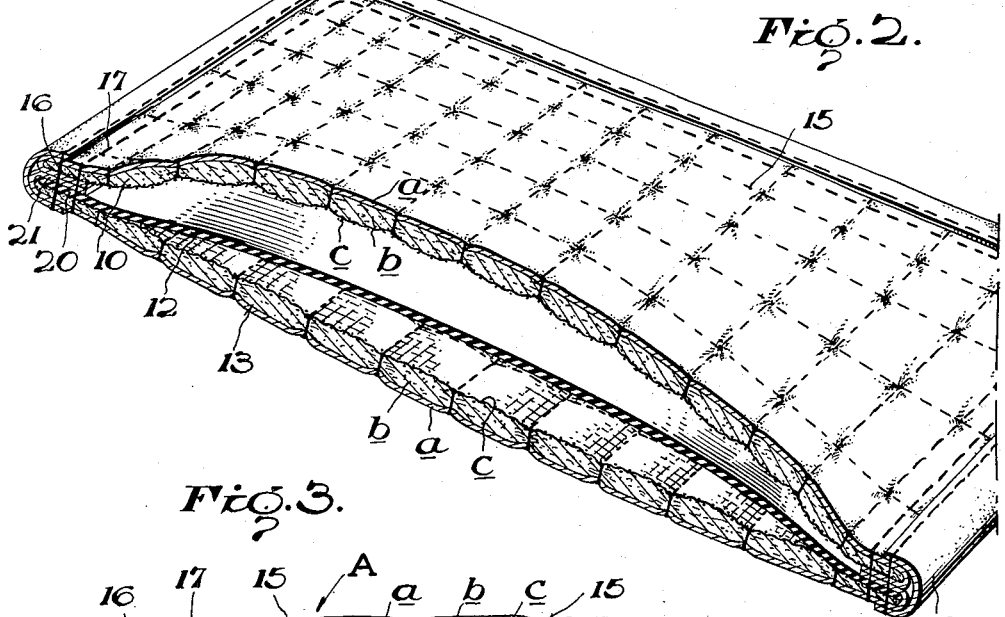
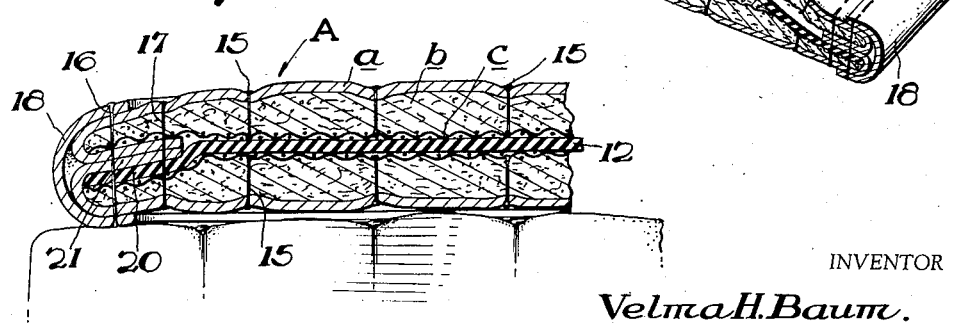
INVENTOR
Velma H. Baum.
BY Emory L. Groff
ATTORNEY

WATERPROOF LAMINATED MATTRESS PAD

Velma H. Baum, Lancaster, Pa.

Application November 5, 1951, Serial No. 254,872

1 Claim. (Cl. 5—354)

The present invention relates generally to bed pads and more particularly to the provision of an improved pad, which is positively waterproof as well as being highly cushioned for comfort and readily washable.

Heretofore bed pads made of several layers of material including a waterproof layer have been superimposed and sewed together by stitches through the layers to hold them together and to quilt the surface for comfort. These stitches through the pad layers pierce the waterproof material in the pad and form many small openings around the stitching thread, thereby making the pad non-waterproof. Also, after each washing of such pads the stitches become stretched or in some cases shrink and are laterally displaced so as to enlarge the openings in the layers made by the stitching thread and result in greater leakage, and the pad is useless as a waterproof article.

An object of this invention is to provide an improved novel method of making a laminated bed pad or the like, whereby the same is positively waterproof, very desirable and readily washable without affecting the waterproof properties thereof and yet made highly cushioned for the maximum comfort of hospitalized patients and others confined to bed for relatively long periods.

Another object is to provide a cushioned waterproof bed pad or the like comprising spaced apart individually formed cushioned layers of material free of the central surface area of an intermediate waterproof layer of material sandwiched therebetween, said layers all being held together only at the edges by suitable means, such as threads or the like.

With these and other objects in view, the invention consists in the construction, arrangement and combination of parts hereinafter described and particularly pointed out in the claim, it being understood that it is not intended to limit the present invention to the details of construction.

In the drawing like parts throughout the several views are given like numerals and are thus identified in the following detailed description:

Figure 1 is a plan view of one face of the novel pad, each face being alike,

Figure 2 is a longitudinal cross-section view of the pad, and

Figure 3 is an enlarged cut-away cross-section of one end of the pad.

Referring in detail to the drawing illustrating one embodiment of the invention, there is a pad A formed from three layer units 10, 12 and 13. The middle layer 12 is formed of waterproof sheet material, such as rubber, plastic or the like and the outer cover layers 10 and 13 are made of quilted units, comprising an outer sheet a, packing material b and cheese cloth c. Preferably the parts a, b, c are stitched together to provide a plurality of square or rectangular sections 14 by crossed stitchings 15. These sections provide for maximum cushioning during use. For example, the intermediate layer 12 is airtight as well as waterproof and as it is slightly spaced and free from the adjacent side of each layer unit 10 and 13, there is a layer or strata of air trapped between each side of the layer 12 and the adjacent sides of the respective quilted layer units. As the layer 12 is completely airtight all air trapped between the layers enhances the cushion effect of the more air pervious quilted surface layers. Thus when the weight of a person is upon the pad the trapped air gradually resists the forces developed by the person's weight and gradually bleeds off the air through the air pervious quilted layers and through the stitching openings. The square sections of the quilted layers outlined by the stitching bleeds off more slowly than it does through the stitch openings, and thus provides a plurality of raised air-cushioned areas over the pad's surface, which are more pronounced when under the pressure of a user's weight.

The outer peripheral edges only of the layers 10, 12 and 13 are stitched together by stitching rows 16 and 17 so that the middle or intermediate layer 12 is entirely free of the outer layers over the central area. Thus the central area of the waterproof layer 12 is entirely free of any thread openings and completely waterproof. Also with the layers of material superimposed in independent, and free central surface relation, it is possible to pad the air spaces between the layers with additional material, if desired, such as loose packing or extra sheets by leaving one end of the pad open in the manner of an envelop.

Preferably the sewed together outer peripheral edges of the pad layers are finished by a surrounding binding tape 18 secured by stitching 16. Also, in making the pad the peripheral edge 20, of the waterproof sheet 12, see Figure 3, may be positioned under the turned over end 21 of the outer sheet a of one of the quilted layer units to thereby make a strong end seam.

There is thus provided a novel and useful improvement in pad constructions, such as may be used for the protection of bed mattresses. The construction of the pad is such as to make the same durable and permanently waterproof as well as to make the same highly cushioned for maximum comfort.

Although only one preferred embodiment of the invention has been illustrated and described in detail it is to be expressly understood that the same is not intended to be limited thereto. Various changes may be made in the design and arrangement of the parts illustrated, as will now probably be apparent to others skilled in the art. To determine the scope of the present invention, reference should be had to the appended claim.

I claim:

A foldable unitary pad for protecting an underlying surface comprising a plurality of superimposed layers of outer and inner sheet means, the outer layer means being air spaced and centrally free of connection with the said inner means, said inner means being waterproof and air tight, and securing means around and embracing the peripheral adjacent superimposed edges of said superimposed layers of the several outer and inner sheet means holding the same in position, said outer layer means each comprising a padded unit formed of an inner sheet of cheese cloth, a middle layer of padding and an outer sheet of cloth and crossed rows of stitching therethrough, thereby forming a plurality of cushion areas between the rows of stitching, said peripheral edge of said inner layer means being overlapped and embraced by the said outer sheet of cloth of one of said outer layers and being further embraced by said securing means.

VELMA H. BAUM.

References Cited in the file of this patent

UNITED STATES PATENTS

| Number | Name | Date |
| --- | --- | --- |
| 1,159,846 | Kindel | Nov. 9, 1915 |
| 1,334,901 | Higdon | Mar. 23, 1920 |
| 1,339,738 | Callahan et al. | May 11, 1920 |
| 2,222,782 | Moses | Nov. 26, 1940 |

FOREIGN PATENTS

| Number | Country | Date |
| --- | --- | --- |
| 154,340 | Austria | Sept. 26, 1938 |